United States Patent
Ness et al.

(10) Patent No.: US 6,386,218 B1
(45) Date of Patent: May 14, 2002

(54) SOLENOID OPERATED VALVE ASSEMBLY FOR VARIABLE BLEED PRESSURE PROPORTIONAL CONTROL

(75) Inventors: John A. Ness, Birmingham; Carl G. Gluf, Jr., Rochester Hills, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/641,423

(22) Filed: Aug. 17, 2000

(51) Int. Cl.⁷ .............................................. F15B 13/044
(52) U.S. Cl. ................ 137/14; 137/596.17; 137/625.26
(58) Field of Search .............................. 137/14, 596.17, 137/625.26

(56) References Cited

U.S. PATENT DOCUMENTS

| | | | |
|---|---|---|---|
| 4,312,380 A | * 1/1982 | Leiber et al. | 137/596.17 X |
| 4,774,976 A | 10/1988 | Janecke et al. | 137/14 |
| 4,998,559 A | * 3/1991 | McAuliffe | 137/596.17 |
| 5,251,659 A | 10/1993 | Sturman et al. | 137/339 |
| 5,996,628 A | 12/1999 | Najmolhoda et al. | 137/625.61 |
| 6,206,038 B1 | * 3/2001 | Klein et al. | 137/596.17 |

* cited by examiner

*Primary Examiner*—Gerald A. Michalsky
(74) *Attorney, Agent, or Firm*—Roger A. Johnston

(57) ABSTRACT

A solenoid operated exhaust bleed type pressure control valve assembly providing a proportional pressure control signal over the full range of solenoid operating current. A poppet valve member is connected to the solenoid armature and closes against a valve seat in the control signal port pressure chamber to prevent flow through the valve seat to the exhaust (bleed) ports. This results in very low or reduced leakage at minimum pressures. The poppet valve contacts a projection on a spool valve for effecting concurrent movement therewith for valving a supply pressure port in the control signal pressure chamber. In the normally closed version of the valve assembly, the poppet delays the spool opening of the inlet or supply port until solenoid current has reached about Five to Twenty Percent (5–20%) of maximum. In the normally open version, the spool is delayed in closing the supply inlet port until solenoid current reaches about Eighty to One Hundred Percent (80–100%) of maximum.

11 Claims, 4 Drawing Sheets

SOLENOID OPERATED VALVE ASSEMBLY FOR VARIABLE BLEED PRESSURE PROPORTIONAL CONTROL

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

The present invention relates to valves of the type that control pressure to a hydraulically actuated device by means of venting to a sump or exhaust a portion of the fluid in a control pressure chamber from a supply of pressurized fluid. Valves of this general configuration are known in the art and are typically electrically controlled by an electromagnetic solenoid which moves a valve member connected to the armature of the solenoid in response to variable current flow in the solenoid coil.

It is often desired to provide a fluid pressure control signal to a control signal port or outlet provided in the control signal pressure chamber for controlling a hydraulically actuated device. Ideally, as the coil current is increased the pressure in the control signal port is either proportionately increased or proportionately decreased depending upon whether the valve is of the normally closed or normally open arrangement with respect to the supply pressure to the control signal pressure chamber.

However, where a relatively low control signal pressure and thus a low flow is desired for operating the hydraulically actuated device, it has been found that the pressure response of the valve with respect to the electrical current flow in the solenoid does not produce a proportional response. Thus, electrical control of the hydraulic actuated device at low levels has proven to be quite difficult; and, the results have been unacceptable where precision control of the hydraulically actuated device is required, as for example, in the shift control devices in power transmissions, particularly for automatic transmissions used in motor vehicles.

Thus, it has been desired to provide an electrically operated pressure control valve for controlling flow of hydraulic fluid to an hydraulically actuated device and to provide linearly proportional control over the full range of energization current to the valve such as, for example, a solenoid operated valve.

BRIEF SUMMARY OF THE INVENTION

The present invention provides a solenoid operated valve which provides flow from a pressure supply inlet to a control signal pressure chamber and a control signal outlet port from the chamber by means of controlling the flow from the inlet to the control signal chamber and by bleeding fluid from the control pressure signal chamber and controlling flow to an exhaust outlet or port from the signal chamber.

The valve of the present invention utilizes a poppet-type valve connected to the solenoid armature for closing and opening against a valve seat formed in the control pressure signal chamber; and, the poppet valve effect is disposed to movement of a spool valve which controls flow from the supply inlet to the control pressure signal chamber.

In one embodiment of the invention, with the solenoid de-energized the exhaust poppet is in the closed position and the spool valve is in the open position with respect to the supply inlet and provides proportional bleeding of exhaust flow and reduction of the inlet flow with increasing solenoid energization current. In the preferred form of the normally open valve, the spool valve closing of the supply inlet is delayed until the coil is energized in the range of about Eighty to One Hundred Percent (80–100%) of maximum coil current, thereby permitting the bleed flow to the exhaust to provide more accurate proportional flow control in the valve as the spool nears closure of the supply inlet.

In another embodiment of the invention in the solenoid de-energized condition the supply inlet port to the control pressure chamber is closed by the spool; and, the poppet valve controlling flow to the exhaust port from the control pressure signal chamber is open. As the solenoid is progressively energized from Zero to One Hundred Percent (0–100%) of maximum current, the inlet is progressively opened and the exhaust progressively closed in a manner providing pressure to the control signal outlet which is proportional to coil energization. In the presently preferred practice, the movement of the spool to open the pressure inlet is delayed until the coil is energized in the range of about Five to Twenty Percent (5–20%) of maximum current.

The present invention thus provides a solenoid operated pressure bleed type hydraulic fluid control valve which exhibits linear proportional control characteristics over the complete range of coil energization from Zero to One Hundred Percent (0–100%) of maximum current.

DETAILED DESCRIPTION OF THE INVENTION

Figure 1:
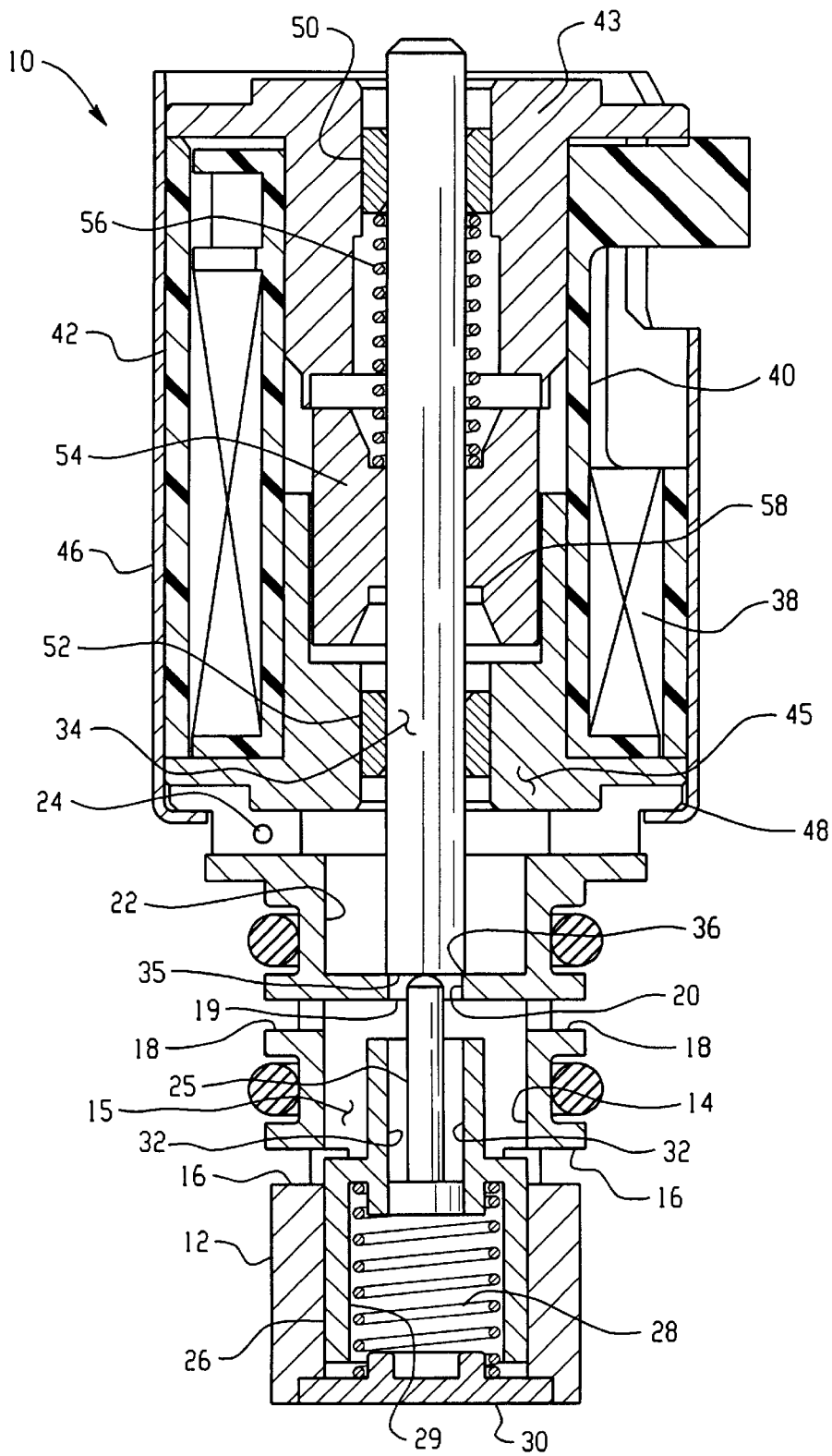
FIG. 1 is a cross-section of an electrically operated valve assembly in accordance with the present invention in the normally open type configuration.

Referring to FIG. 1, the valve assembly of the present invention is indicated in the normally open version or configuration generally at 10 and includes a valve body 12 having a valving bore 14 formed therein which forms a control signal pressure chamber 15, having an inlet port 16 adapted for connection to a high pressure supply of fluid (not shown), such as hydraulic fluid, and a control signal outlet port 18 disposed in axially spaced arrangement from the supply port 16 along the bore 14.

Control signal pressure chamber 15 has an upper end wall 19 thereof provided with an aperture 20 which communicates with an exhaust chamber 22 which has at least one and preferably two exhaust ports 24 formed therein an which are adapted to be connected to a sump or pump return to the supply (not shown).

Control pressure signal chamber bore 14 has a spool valve 26 slidably disposed therein in closely fitting arrangement. Spool valve 26 is biased upwardly by a spring 28 received in a hollow 29 formed in the lower end of the spool; and, spring 28 is retained therein by a closure member 30 provided in the lower end of the block which is sealed and secured therein by any suitable expedient.

Spool 26 has a plurality of axial passages 32 formed therethrough to hollow 29 to provide pressure equalization across the ends thereof. The spool 26 has a rod-like extension or projection 25 extending axially upwardly therefrom through the exhaust chamber aperture 20 and is in contact with the lower end of a elongated or rod-like valve member 34 which has its lower end seated against an annular region or a valve seat 36 provided around the upper end of the aperture 20.

A solenoid coil 38 is mounted on a bobbin 40 and covered by a metallic non-insulating sleeve 42 and disposed between axially spaced annular pole pieces denoted respectively by reference numeral 43 for the upper pole piece and 45 for the lower pole piece; and, the assemblage thereof retained on body 12 by crimping of the end of an outer cylindrical shell 46 such as shown crimped over flange 48 provided on the upper end of body 12. Shell 46 completes the flux loop around coil 38. Valve member 34 is slidably received in an upper and lower bearing respectively denoted by reference numerals 50, 52 disposed respectively in the pole pieces 43, 45.

An annular ferromagnetic armature 54 is secured over the valve member 34. The armature is positionally retained on the valve member 34 by a suitable expedient or press fit arrangement. The armature 54 is biased downwardly by spring 56 which has its upper end registered against bearing 52 and its lower end registering against an annular recess formed in the upper end of armature 54.

It will be understood that the normally open valve arrangement 10 illustrated in FIG. 1 is shown in the coil de-energized condition wherein the spring 56 biases armature and valve member 34 downwardly until the valve member has its lower end surface 35 seated against valve seat 36 closing the exhaust ports 24 from the control pressure signal chamber 14. The length of the spool extension 25 is chosen such that when valve 34 is seated on valve seat 36, the upper end of spool 26 is positioned so as to partially open supply inlet port 16 to control pressure signal chamber 15. Thus, in the de-energized condition, the normally open valve of FIG. 1 provides a reduced pressure flow to control pressure signal chamber 14 and control signal output port 18.

Figure 3:
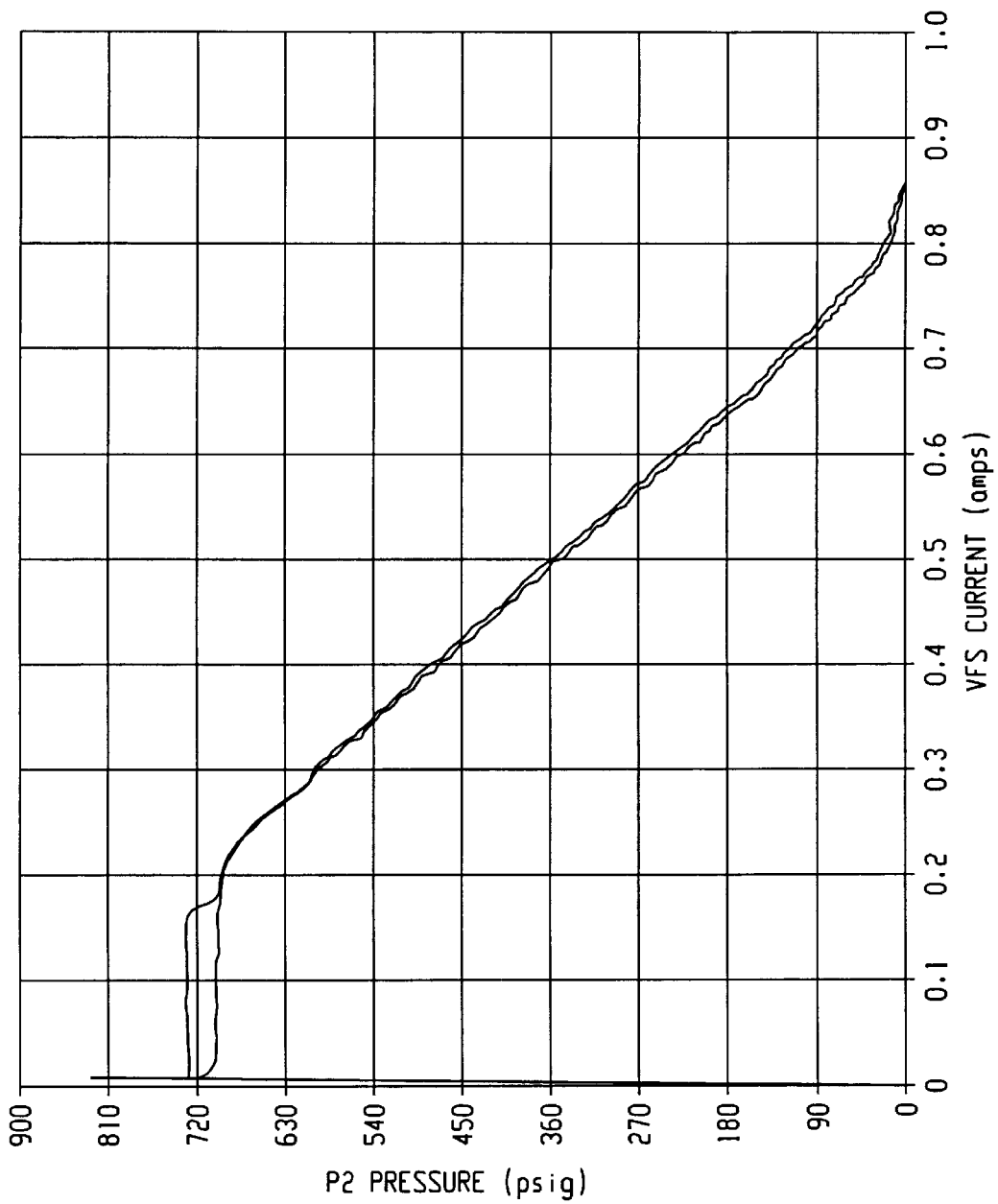
FIG. 3 is a graph of flow versus percentage of maximum coil current for the valve of FIG. 1; and, FIG. 4 is a graph similar to FIG. 3 of the flow characteristics of the valve of FIG. 2.
Figure 4:
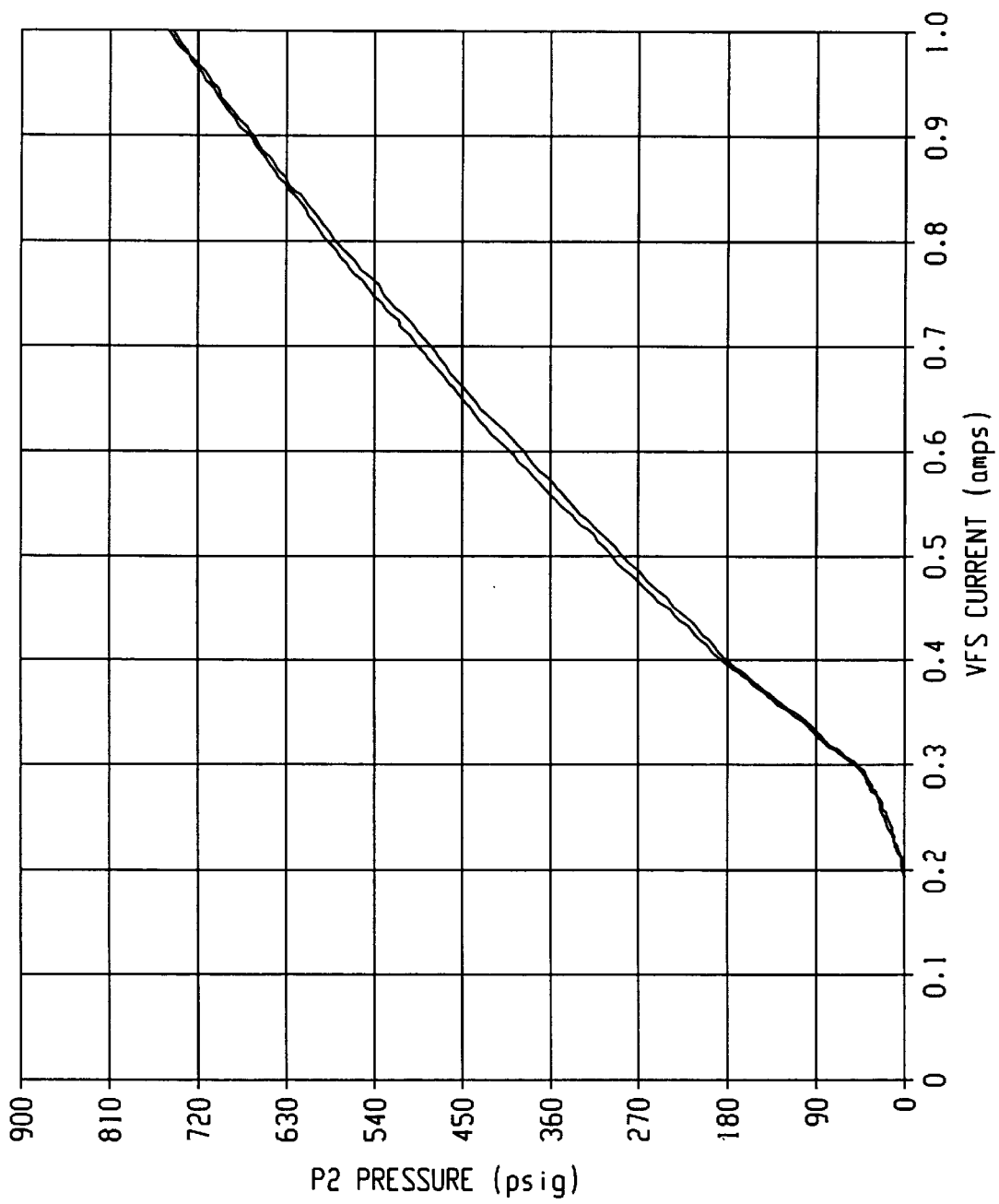

As the coil 38 of the solenoid is energized progressively from Zero to One Hundred Percent (0–100%) of maximum current, armature 54 moves valve member 34 upwardly overcoming the bias of spring 56 and opening the valve member from valve seat 36 an amount proportionate to the energization level of the current in the coil. Concurrently, spring 28 biases spool 26 upwardly to maintain contact against the lower end of valve member 34 such that the spool 26 follows the movement of valve member 34 and armature 54. Thus, as the spool nears the position closing inlet port 16, the lower end 35 of valve member 34 is lifted from valve seat 36 to open the aperture 18 and provide greater flow to exhaust ports 24 thus maintaining proportional control of the pressure in the control signal port 18 as the spool 26 closes off supply inlet 16. The present invention thus provides for simultaneous closure of the supply inlet port and opening of the exhaust port and thereby provides linear proportional control over the full operating range of coil energization current. It will be understood that the embodiment of FIG. 1 is of the type of valve providing inversely proportional pressure control, in as much as increasing the coil current results in closure of the inlet and opening of the exhaust port thereby providing a pressure in the control signal output port 18 which is inversely proportional to coil energization current as shown in the graph of FIG. 3.

Figure 2:
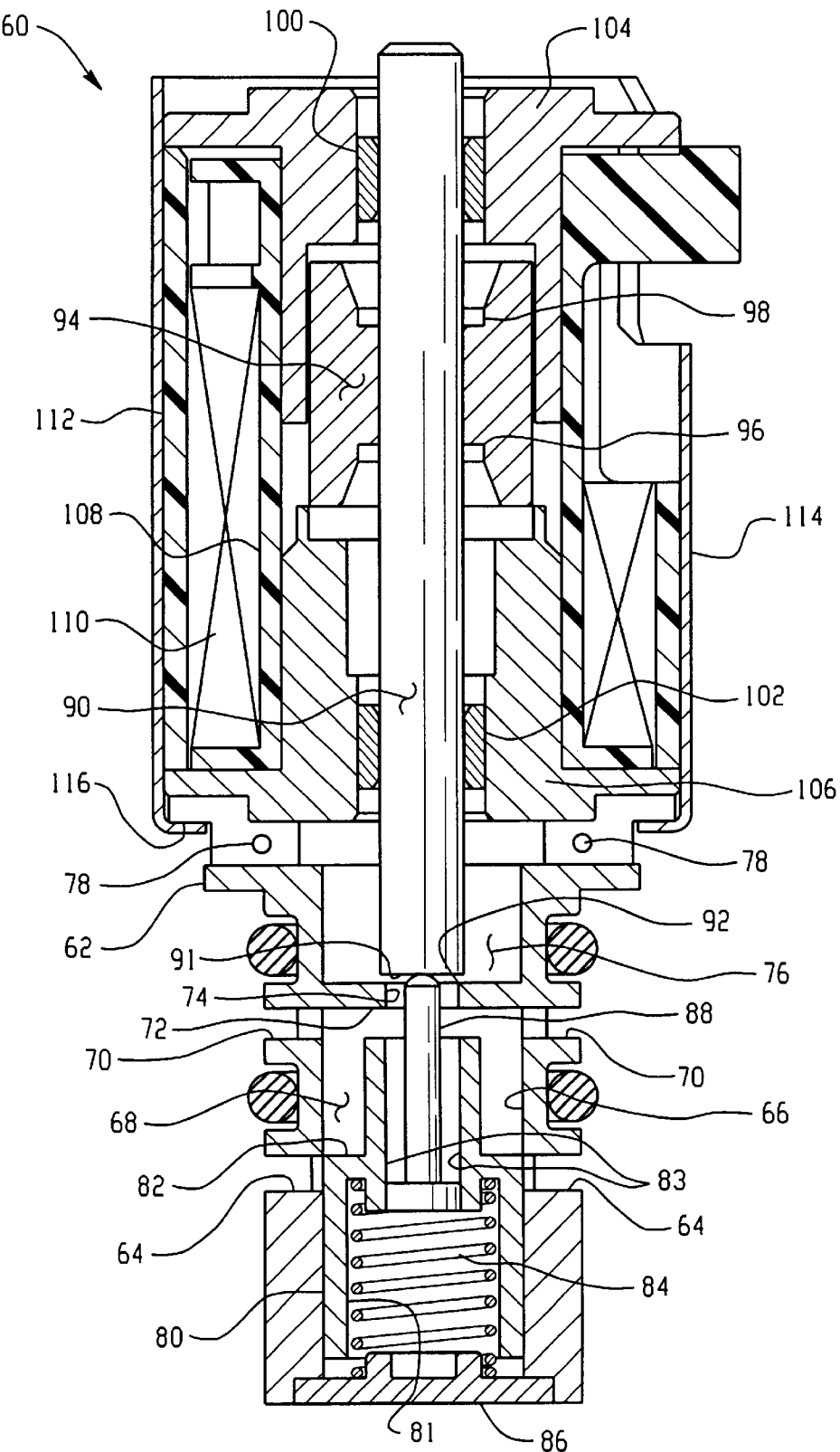
FIG. 2 is a view similar to FIG. 1 of a solenoid operated pressure bleed type valve in the normally closed configuration.

Referring to FIG. 2, another embodiment of the invention is indicated generally at 60 which is a normally closed valve shown in the coil de-energized condition, and which provides increasing pressure at a signal output port as a function of increasing energization as will be described hereinafter in greater detail.

The valve assembly 60 includes a valve body 62 having at least one and preferably two inlet supply ports 64 adapted for connection to a source (not shown) of pressurized fluid which communicate with a bore 66 forming a control signal pressure chamber 68 which also has at least one and preferably two control signal outlet ports 70 formed therein and which are adapted for connection to a fluid pressure actuated device (not shown) such as a hydraulic actuator.

The upper end of bore 66 and chamber 68 is closed by a wall 72 which has formed therein an aperture 74 which communicates with an exhaust pressure chamber 76 which has formed therein at least one and preferably two exhaust outlet ports 78.

A valving spool 80 is slidably disposed in closely fitting arrangement in bore 66. Spool 80 has a shoulder 82 formed thereon which is operative to close inlet port 64 when biased to the upward position by a spring 84 received in a hollow 81 provided in the lower end of spool 80. Spring 84 is retained at its lower end by a closure 86 which is secured and sealed in the body by any suitable expedient.

The upper end of spool 80 has a plurality of passages 88 formed therethrough to communicate with the hollow 81 containing spring 84 to thereby provide pressure equalization on the ends of the spool 80. A projection or extension 88 extends upwardly from the upper end of spool 80 and through aperture 74 to contact the lower end 91 of an elongated or rod-like valve member 90. The lower end 91 of valve member 90 is moved between a plurality of positions opening and a position closing against a valve seat 92 formed about the upper end of aperture 74. It will be understood that when the lower end 91 of valve 90 seats on valve seat 92, flow from pressure control chamber 68 to exhaust chamber 76 is blocked. It will be further understood that when spool 80 is moved progressively downwardly from the position shown in FIG. 2, the shoulder 82 progressively opens inlet passage 64 and permits flow to pressure control chamber 68. It will be seen from FIG. 2 that when the spool 80 is in the upward position closing inlet port 64 that the projection 88 moves the lower end 91 of valve member 90 to a position opening valve seat 92 to permit the pressure in control pressure chamber 68 to be vented to the exhaust ports 78.

Valve member 90 has an annular ferromagnetic armature 94 received thereover and secured thereon by any suitable method, such as press fit 98. The valve member 90 is slidably guided in bearings 100, 102 received in respectively annular pole pieces 104, 106 disposed in axially spaced arrangement with a coil bobbin 108 received thereover having a coil 110 wound thereon and a cylindrical spacer or sleeve 112 received thereover to form a solenoid coil assembly. The solenoid coil assembly is secured on the body 62 by an outer shell 114 which has its ends crimped such as shown for the lower end of the shell crimped over a flange 116 provided on body 62. The outer shell 114 thus completes the flux loop about the coil with the pole pieces 104, 106.

In operation, with the valve shown in the coil de-energized condition in FIG. 2, as increasing current flows in the coil 110, the armature 94 and valve member 90 begin to move downward closing the bottom surface 91 of the valve 90 toward valve seat 92 and cracking open inlet port 64 with shoulder 82 of spool 80 permitting flow from inlet 64 to control pressure chamber 68 which produces a control pressure signal at outlet ports 70. As coil energization increases, movement of the valve member 90 and spool 80 is linearly proportional to the coil energization current and results in a pressure rise in control signal output port 70 as shown in FIG. 3. In the present practice of the invention, the valve is designed such that the spool opening of the inlet port 64 is delayed until the coil current is in the range of about Five to Twenty Percent (5–20%) of maximum which permits some initial movement of the valve member 90 toward valve seat 92 before inlet ports 70 are opened to the control pressure signal chamber 68.

The present invention thus provides in both the normally closed and normally open versions a solenoid operated pressure bleed valve which provides a control pressure signal either directly or inversely proportionate to the coil current throughout the full range of solenoid energization.

Although the invention has hereinabove been described with respect to the illustrated embodiments, it will be understood that the invention is capable of modification and variation and is limited only by the following claims.

What is claimed is:

1. A solenoid operated valve assembly for variable pressure bleed proportional control comprising:
   (a) a valve body having a valving bore with a valving spool moveably disposed therein and an inlet port communicating with said bore and a control pressure outlet port communicating with said bore and axially spaced from said inlet port, said bore having an end wall with an aperture therethrough and a valve seat formed about said aperture on the side of said wail opposite said bore;
   (b) an exhaust port communicating with said valve seat;
   (c) a solenoid coil attached to said body and having an armature moveably disposed therewith and operable for movement in response to electrical energization of said coil and including a valve member operable for contacting and sealing on said valve seat and blocking flow thereacross, wherein upon de-energization of said coil said valve member is biased to a position contacting and sealing said valve seat and upon energization of said coil progressively from Zero to One Hundred Percent (0–100%) of maximum current, said valve member is proportionately moved away from said valve seat and said spool is moved to a position blocking said inlet when said coil is energized in the range of about Eighty to One Hundred Percent (80–100%) of maximum coil energization.

2. The valve assembly defined in claim 1, wherein said valve body includes a valving chamber communicating with said aperture and said exhaust port.

3. A solenoid operated valve assembly for variable pressure bleed proportional control comprising:
   (a) a valve body having a valving bore with valving spool moveably disposed therein and an inlet port communicating with said bore and a control pressure outlet port communicating with said bore and axially spaced from said inlet port said bore having an end wall with an aperture therethrough and a valve seat formed about said aperture on the side of said wall opposite said bore;
   (b) an exhaust port communicating with said valve seat; and,
   (c) a solenoid coil attached to said body and having an armature moveably disposed therewith and operable for movement in response to electrical energization of said coil and including a valve member operable for contacting and sealing on said valve seat and blocking flow thereacross, wherein upon de-energization said valve member is biased to a position opening said valve seat and said spool is biased to a position blocking said inlet and upon energization of said coil progressively from Zero to One Hundred Percent (0–100%) of maximum current wherein said valve member is moved proportionately and said spool remains in said position blocking said inlet until a coil current in the range of about Five to Twenty Percent (5–20%) of maximum is reached, whereupon said spool is moved proportionately to open said inlet.

4. The valve assembly defined in claim 3, wherein said spool includes an extension extending through said valve seat and operatively contacting said valve member.

5. The valve assembly defined in claim 3, wherein said spool includes an extension extending through said valve seat and contacting said valve member.

6. The valve assembly defined in claim 3, wherein said valve member comprises an elongated member, and said armature comprises an annular member received on said elongated member.

7. A method of bleeding pressure for proportional control in a solenoid operated valve comprising:
   (a) disposing a spool in a valve body bore and moving said spool and controlling flow from a pressure supply inlet port to a control signal chamber having a control pressure outlet port;
   (b) forming a ported exhaust valving chamber in the valve body and forming an aperture communicating the exhaust valving chamber with the signal chamber;
   (c) disposing a moveable valve member in said signal chamber and moving said valve member for closing and opening said aperture and extending a portion of said spool through said exhaust chamber aperture and contacting said valve member;
   (d) attaching a solenoid to said valve body and operatively connecting the solenoid armature for effecting said moving of said valve member;
   (e) biasing said valve member to close said exhaust chamber aperture and said spool to open the supply inlet to the control signal chamber with the solenoid de-energized; and,
   (f) energizing the solenoid with progressively from Zero to One Hundred Percent (0–100%) of maximum current and moving said armature and valve member proportionately to open said exhaust chamber aperture and moving said spool progressively to close said supply inlet.

8. The method defined in claim 7, wherein said step of operatively connecting the solenoid armature includes disposing an annular armature on an elongated valve member.

9. The method defined in claim 7, wherein said step of moving said spool includes delaying said moving said spool to a position blocking said inlet until said coil energization is in the range of Eighty to One Hundred Percent (80–100%) of maximum current.

10. A method of bleeding pressure for proportional control in a solenoid operated valve comprising:

(a) disposing a spool in a valve body bore and moving said spool and controlling flow from a pressure supply inlet port to a control pressure signal chamber having a control pressure outlet port;

(b) forming a ported exhaust valving chamber in the valve body and forming an aperture communicating the exhaust valving chamber with the signal chamber;

(c) disposing a moveable valve member in said signal chamber and moving said valve member for closing and opening said aperture and extending a portion of said spool through said exhaust chamber aperture and contacting said valve member; contacting said valve member;

(d) attaching a solenoid to said valve body and operatively connecting the solenoid armature for effecting said moving of said valve member;

(e) biasing said valve member to open said exhaust chamber aperture and said spool to close the supply inlet to the control signal chamber with the solenoid de-energized; and, (f) energizing the solenoid with progressively from Zero to One Hundred Percent (0–100%) of maximum current and moving said armature and valve member proportionately to close said exhaust chamber aperture and moving said spool proportionately to close said supply inlet.

11. The method defined in claim 10, wherein said step of moving said spool proportionately includes delaying inlet opening until said current in the range of about Five to Twenty Percent (6–20%) of maximum current is reached.

* * * * *